No. 758,969. Patented May 3, 1904.

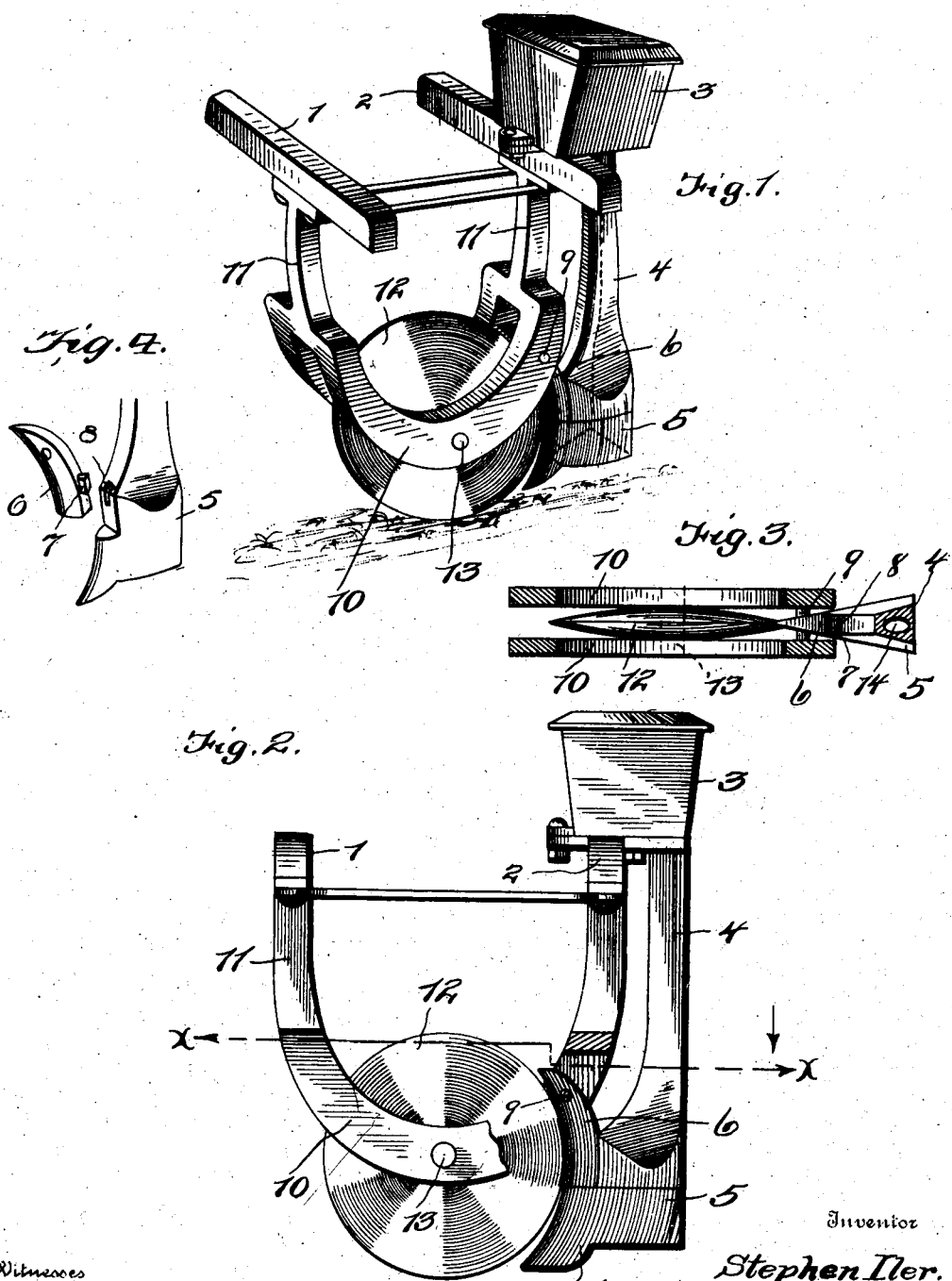

UNITED STATES PATENT OFFICE.

STEPHEN ILER, OF JOLLEY, IOWA.

ATTACHMENT FOR PLANTERS, PLOWS, &c.

SPECIFICATION forming part of Letters Patent No. 758,969, dated May 3, 1904.

Application filed September 16, 1903. Serial No. 173,425. (No model.)

*To all whom it may concern:*

Be it known that I, STEPHEN ILER, a citizen of the United States, residing at Jolley, in the county of Calhoun and State of Iowa, have invented certain new and useful Improvements in Attachments for Planters, Plows, &c.; and I do hereby declare the following to be a full, clear, and exact description of the invention, such as will enable others skilled in the art to which it appertains to make and use the same.

My invention relates to an attachment for planters, plows, &c.; and it consists of certain novel features of combination and construction of parts, the preferred form whereof will be hereinafter set forth, reference being had to the accompanying drawings, in which—

Figure 1 shows a perspective view of my invention as applied for use upon a grain-planter. Fig. 2 is a side elevation thereof, partly in section, while Fig. 3 is a sectional view of Fig. 2 on line $x$ $x$, and Fig. 4 is a detail perspective view of certain parts of my invention.

Briefly stated, my invention comprehends a revolving cutting-disk or colter disposed in front of the planter-shovel or furrow-marker, adapted to open the ground in advance of the shovel or marker, whereby all roots, weeds, cornstalks, or the like will be severed and the line of the furrow immediately in front of the shovel freed from all obstructions.

Numerals will be employed to designate the various details of my invention and coöperating elements, and, referring to the numerals on the drawings, 1 and 2 designate a portion or cross-bars of the frame of the machine, while 3 indicates the hopper or grain-holding receptacle, and 4 designates a hollow shank, carrying at its lower end a shovel or furrow-opener 5 of proper form to take into the ground and throw the soil to either side thereof, and thereby insure that the seed will be deposited a sufficient depth in the soil. The shovel 5 is so constructed that the upper portion thereof is cut away to provide a seat for the removable blade 6, which is so formed as to have a forwardly-projecting cutting edge of proper thickness, and has upon its rear side a preferably dovetail shank 7, designed to fit the corresponding seat 8 provided in the upper portion of the shovel-section 5, thereby insuring that the cutting-blade 6 may be readily removed from its seat for the purpose of sharpening or replacement in case the same should become broken.

The upper portion of the removable blade 6 is provided with a suitable aperture to receive the bolt or pin 9, which is adapted to extend through the U-shaped brackets or arms 10, the upper ends of which merge into or are integrally formed with the depending standards or brackets 11, attached to the frame-sections 1 and 2 in any preferred way. The parallel brackets or U-shaped arms 10 are disposed a sufficient distance apart to receive between them the rotating cutting-disk or colter 12, which is operatively mounted upon the bearing or shaft 13, the shaft being of such character as to be easily removable, whereby the colter may be removed from its operative position to be sharpened or replaced, as desired.

By reference to Fig. 3 it will be seen that the shank 4 is provided with an opening 14, through which the grain is adapted to fall into the open furrow from the grain-receptacle 3, any suitable feeding mechanism for discharging the desired quantity of grain from the receptacle being employed.

The cutting-blade 6 and the rotating colter 12 are arranged in close approximation, whereby any cornstalk, weed, root, or the like not entirely severed by the rotating colter 12 will be engaged by the shovel 5, and as the unsevered stalk, root, &c., rides upon said shovel it will be completely severed by the combined or coöperative work of the colter 12 and blade 6, inasmuch as said parts are arranged in very close approximation, though they do not, of course, touch each other, whereby either of said devices will become dulled or injured.

It will thus be seen that I have provided a proper reinforcement for the cutting-blade 6 by means of the removable bolt or shaft 9, which will not only sustain the upper end of the cutting-blade, but will permit it to be bodily removed or sharpened, it being understood that the edge of said blade should be kept properly drawn out or extended so as to lie in very close approximation to the edge of the rotating colter.

The various parts of my invention may be very cheaply and expeditiously manufactured and readily assembled each in its respective operative position, and while I have described the preferred combination and construction of parts I wish to comprehend such substantial equivalents and substitutes as may be considered as falling fairly within the scope of my invention.

Believing that the advantages and manner of using my invention have thus been made clearly apparent, further description is deemed unnecessary.

What I claim as new, and desire to secure by Letters Patent, is—

1. The herein-described colter attachment for furrow-making shovels, comprising the combination with a shovel 5 having a seat in its upper edge, a cutting-blade having its forward end sharpened and also having an extension to fit said seat, and means to secure said cutting-blade within said seat, of a colter and suitable guiding-brackets therefor, said colter being mounted in said brackets to extend its peripheral edge in close approximation with the cutting edge of said cutting-blade, whereby any cornstalk, weed or the like moved upward by the shovel will be severed, as set forth.

2. The combination with a furrow-making shovel having a dovetail seat in its upper edge, a cutting-blade having a dovetail extension to fit said seat, and means to removably secure said shank in said seat, of a colter and brackets therefor, said colter being mounted within said brackets to bring its peripheral edge in close approximation with the cutting-blade, substantially as set forth.

In testimony whereof I affix my signature in presence of two witnesses.

STEPHEN ILER.

Witnesses:
   H. C. DONAKER,
   L. W. PEARSON.